Aug. 30, 1960 W. E. GOOD 2,951,114

CARRIER WAVE TRANSMISSION SYSTEM AND METHOD OF OPERATION THEREOF

Filed Jan. 5, 1955 2 Sheets-Sheet 1

INVENTOR:
WILLIAM E. GOOD,

BY Julius J. Zaskalicky
HIS ATTORNEY.

INVENTOR:
WILLIAM E. GOOD,
BY Julius J. Zaskalicky
HIS ATTORNEY.

United States Patent Office 2,951,114

Patented Aug. 30, 1960

2,951,114

CARRIER WAVE TRANSMISSION SYSTEM AND METHOD OF OPERATION THEREOF

William E. Good, Jamesville, N.Y., assignor to General Electric Company, a corporation of New York Filed Jan. 5, 1955, Ser. No. 479,935

9 Claims. (Cl. 178—5.4)

The present invention relates to carrier wave transmission systems and has as a particular object thereof to provide a method and apparatus for testing the operativeness of the color synchronizing, demodulation and matrixing circuits of a color television receiver.

Present day color television receivers include a color synchronizing and demodulation circuit having a pair of synchronous detectors each including a pair of inputs and an output. To one input of each of these detectors is applied the subcarrier wave of a demodulated television signal. To the other input of one of said detectors is applied a wave of subcarrier frequency and in phase therewith and to the other input of the other of said detectors is applied a wave of subcarrier frequency and in phase quadrature therewith. The aforementioned one wave of subcarrier frequency is obtained from a color synchronizing signal generator which includes a gating means periodically rendered operative at the horizontal scanning frequency of said system for allowing the synchronizing bursts of waves of subcarrier frequency appearing on the demodulated television signals to pass therethrough and synchronize the output of the color synchronizing generator.

Thus, at the output of the detectors are obtained a pair of waves, one corresponding to one color component of a color picture and the other corresponding to another color component. By combination of these outputs with an output corresponding to a composite picture, the individual color components of the picture may be obtained. Thereupon they are applied to a color television tube to synthesize the transmitted color picture.

To obtain good color picture rendition in a receiver having such a synchronizing circuit, it is important that the aforementioned color synchronizing circuit be carefully, accurately, and precisely aligned. For example, it is essential that the phase of the subcarrier from the output of the color synchronizing generator be accurately set with respect to the phase of the burst subcarrier wave. Also, it is important that the phase of the one of these subcarrier waves applied to one detector be exactly in phase quadrature with respect to the phase of the wave applied to the other detector. Also, it is important for the outputs from these detectors to be balanced or adjusted to a predetermined ratio. It is further important that the outputs of these two detectors vary linearly with input.

Heretofore various techniques have been utilized for making the above described adjustments to align the color synchronizing circuit of a color television receiver. One such technique makes use of a bar signal generator which develops waves of subcarrier frequency having a phase, duration and time of occurrence to simulate a series of bar patterns of different colors. The output from this generator is applied to the color synchronizing circuit and appropriate measurements are made and indications obtained at the output from the color synchronizing circuit to thereby obtain an indication of the performance of the color synchronizing circuit. It is readily apparent to those skilled in the art that such techniques are complicated and involve expensive apparatus.

The present invention is directed to eliminating the need for any thing but the simplest apparatus and elementary procedure for obtaining the necessary indications for the alignment of the color synchronizing circuit.

Accordingly, an object of the present invention is to provide improved means for aligning the color synchronizing circuit of a color television receiver.

Another object of the present invention is to provide a simple and effective method for determining the operativeness of a suppressed carrier wave receiving system.

A general object of the present invention is to provide improvements in carrier wave transmission systems.

In carrying out the present invention as applied to such color synchronizing and demodulation circuits as described above, there is provided a signal generator for developing a signal having a frequency differing from said subcarrier frequency by an integral multiple of the line scanning frequency of said receiver. Means are provided for applying said signal to one input of each of said detectors. Means are also provided for applying to said burst gating means said same signal in addition to applying thereto a signal for rendering said burst gate means operative periodically at said horizontal scanning frequency. Thus, at the output of said burst gating means is obtained a wave having said subcarrier frequency which wave is passed to said color synchronizing generator to synchronize the latter therewith. Accordingly, at the outputs of said detectors is obtained a pair of waves of a frequency which is said integral of said line scanning frequency. By comparing the characteristics of said derived waves, the characteristics of said color synchronizing and demodulating circuit may be obtained and the desired alignment made.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing wherein:

Figures 1, 3:
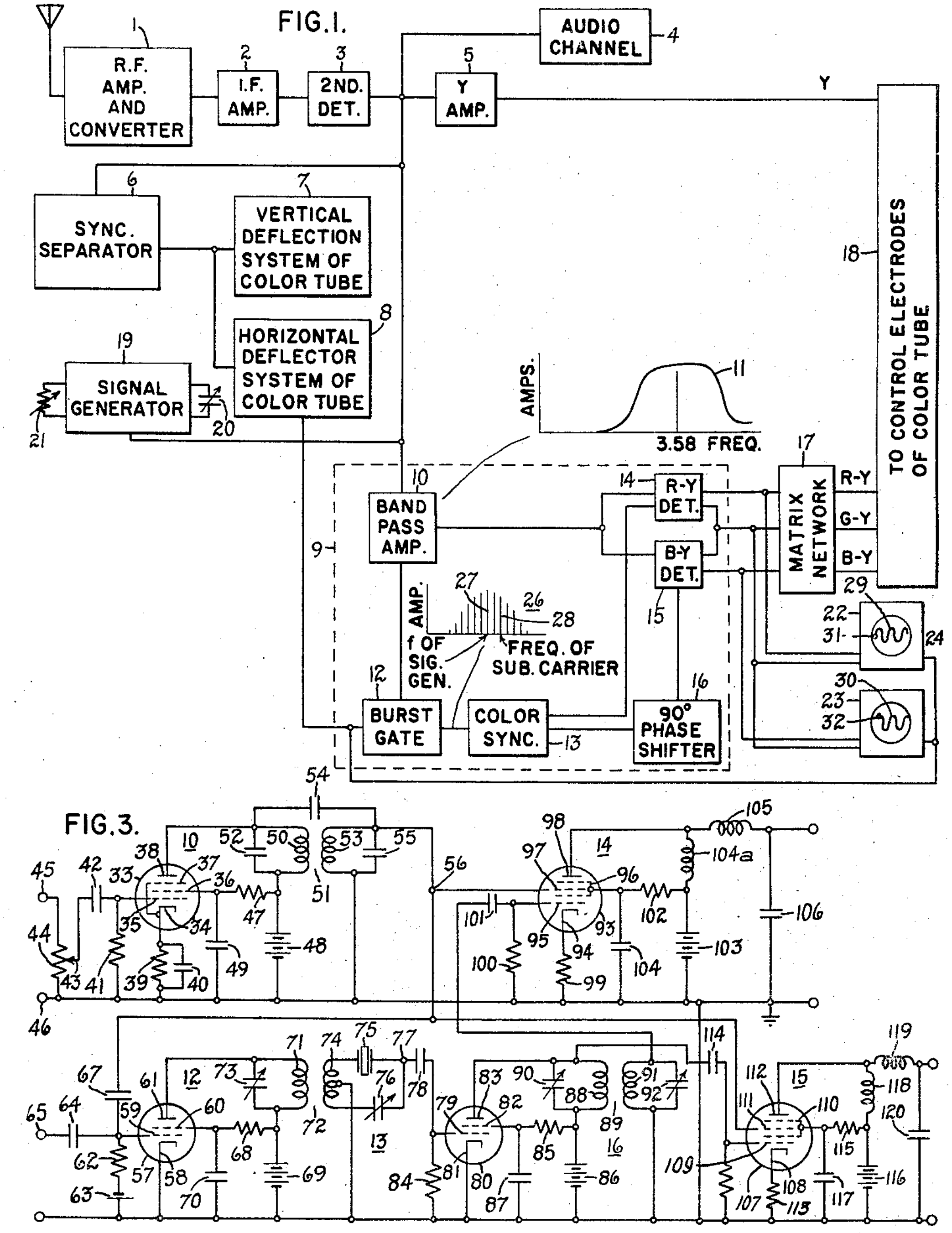
Fig. 1 shows a schematic diagram in block form of a portion of a television receiver showing the color synchronizing circuits thereof and connection of apparatus thereto for the testing thereof in accordance with the present invention.
Fig. 3 shows a schematic diagram of the color synchronizing circuit of Fig. 1.

Referring now to Fig. 1, there is shown a color television receiver and apparatus in association therewith in accordance with the present invention useful in aligning the color synchronizing circuits thereof. A portion of the color television receiver comprises an R.-F. amplifier and converter 1, an I.-F. amplifier 2, a second detector 3. The audio portion of the output of the second detector is applied to the audio channel 4. The video portion of the output from the second detector 3 is applied to the video or Y amplifier 5, symbol Y having reference to the luminance component of the color TV signal. The sync separator 6 derives synchronizing information from the output of the second detector 3 and applies this information to the vertical deflection system 7 and to the horizontal deflection system 8 of the receiver. The output of the second detector is also applied to the color synchronizing circuit 9.

The color synchronizing circuit includes a bandpass amplifier 10 for passing the frequencies corresponding to the color subcarrier and modulations thereof as shown in graph 11 in which the abscissa thereof represents frequency and the ordinate thereof represents amplitude. The output from the bandpass amplifier 10 is applied to a burst gating means 12 which passes the output thereof to the color synchronizing generator 13. Burst gating means 12 is rendered conductive to pass the output from the bandpass amplifier to the color synchronizing generator during that interval of time in which the color burst reference subcarrier appears in the color television signal. For this purpose a pulse is derived from the horizontal deflection system of the receiver at the proper time.

The synchronizing circuit also includes a color synchronizing generator 13 which develops a wave of subcarrier frequency synchronized with the subcarrier burst of reference phase from burst gating means 12. Ordinarily, the color synchronizing generator 13 is designed to respond to only waves of subcarrier frequency and waves in the immediate vicinity thereof. The output from color sync generator 13 is applied in one phase to the R–Y synchronous detector 14 and in phase quadrature with respect to said one phase to the B–Y synchronous detector 15 through phase shifter 16.

Thus, any component of demodulated subcarrier signal corresponding to R–Y in the output of the bandpass amplifier 10 is obtained at the output of the R–Y detector, and similarly, any component corresponding to B–Y is obtained at the output of the B–Y detector. The R–Y and B–Y components are applied to a matrix network 17 which derives a signal corresponding to the third primary color component G–Y from this information. Signals corresponding to the three primary color components of the transmitted picture and the luminance signal Y are then applied to the proper control electrodes generally indicated 18 of the color picture tube to obtain a rendition of the picture.

As pointed out above, it is very important for the color synchronizing circuit 9 to be properly aligned for proper performance of a color television receiver. This proper alignment includes the adjustment of the phase of the output of the color synchronizing generator 13 with respect to the subcarrier of reference phase, the adjustment of the 90 degree phase shifter so that the waves applied to the synchronous detectors 14 and 15 are in phase quadrature, the adjustment of the relative amplitudes of the outputs of sync detectors 14 and 15 and a check on their linearity.

The present invention is directed to facilitating the desired alignment by simple apparatus and procedure. To this end a signal generator 19 having a variable frequency control 20 and variable amplitude control 21 is arranged to apply the output thereof to the input to bandpass amplifier 10. The frequency of the signal generator 19 is adjusted to be equal to a frequency differing from the subcarrier frequency by an integral multiple of the frequency of the horizontal scanning system. The output of the R–Y detector 14 is connected to the vertical deflection plates of an oscilloscope 22, the horizontal deflection of which is synchronized with the horizontal scanning rate of the television receiver. Similarly, the output from the B–Y detector 15 is applied to the vertical deflection plates of the oscilloscope 23, the horizontal scanning of which is synchronized with the horizontal scanning of the television receiver. The gating pulses from the horizontal deflection system which are also applied to the burst gate 12 to control the conduction thereof are applied to the intensity control electrode of the oscilloscopes 22 and 23.

Figure 2A:
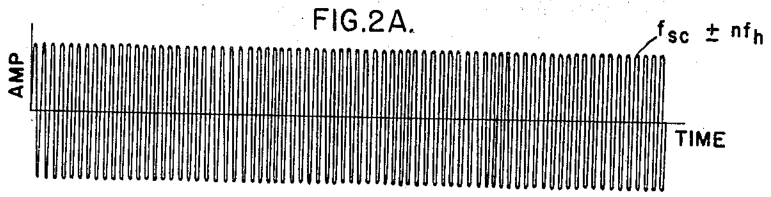
Fig. 2A shows a graph of the output of the signal generator of Fig. 1.
Figure 2B:
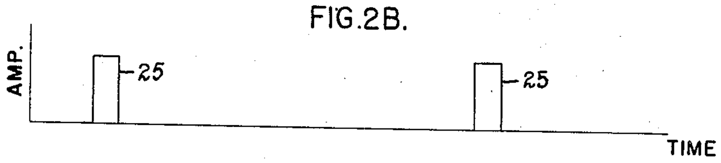
Fig. 2B shows a graph of the pulses applied to the burst gating circuit of Fig. 1.
Figure 2C:
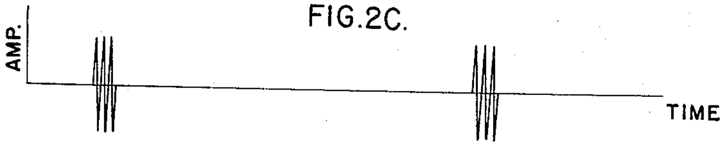
Fig. 2C shows the output obtained from the burst gating circuit of Fig. 1.
Figure 2D:
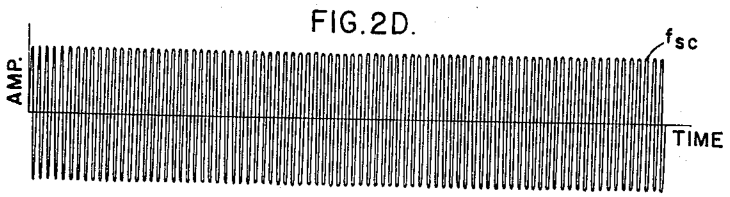
Fig. 2D shows the output obtained from the color synchronizing generator of Fig. 1.
Figure 2E:
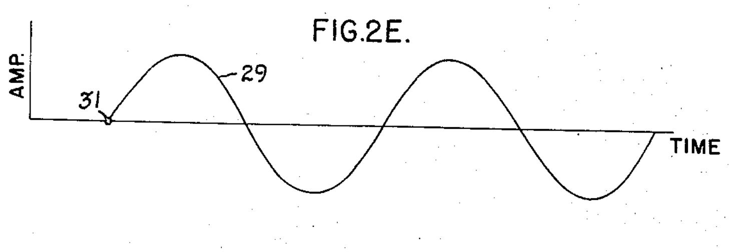
Fig. 2E shows a graph of the wave obtained from the output of the R–Y detector of Fig. 1.
Figure 2F:
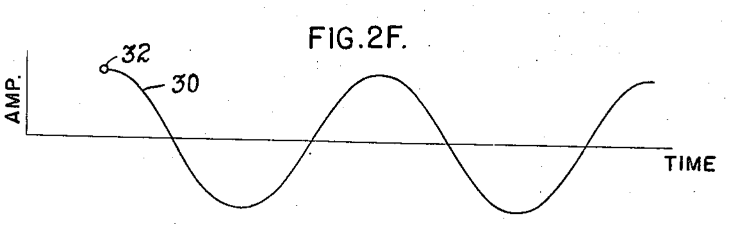
Fig. 2F shows a graph of the output obtained by the B–Y detector of Fig. 1.

The operation of the present invention will now be explained in connection with the graphs of Figs. 2A, 2B, 2C, 2D, 2E, and 2F which are plots of amplitude versus time. The graph of Fig. 2A represents the output from signal generator 19 and has a frequency equal to a frequency differing from the subcarrier frequency by an integral multiple of the horizontal scanning frequency of the receiver. Fig. 2B represents an output from the horizontal deflection system 8 and comprises a series of pulses 25 occurring during the presence of the carrier wave of reference frequency in the demodulated television signal. This wave is applied to the input of the burst gating means 12 to control the conduction thereof as pointed out above. Fig. 2C represents a graph of the output from the burst gating means 12, and while only several cycles of the output are shown, it is understood that this is done only to simplify the drawing thereof. Graph 26 represents distribution of the frequencies of the pulses of carrier waves shown in graph of Fig. 2C. It is noted that, for example, if the frequency 27 of the signal generator 19 is less than the frequency of the subcarrier by twice the horizontal scanning rate, then the frequency represented by line 28 in graph 26 corresponds to the frequency of the subcarrier. The color sync generator 13 will thus synchronize with this frequency, the output thereof being represented by the graph of Fig. 2D. The heterodyning of the waves of Fig. 2A and 2D in the synchronous detector 14 will produce at the output thereof a wave having a form shown in graph 29 having a frequency equal to the difference in frequency of the applied waves. Similarly, the heterodyning of the carrier waves of Fig. 2A and the wave of Fig. 2D shifted in phase by 90 degrees with respect to the wave applied to detector 14 will result in a carrier wave 30 of the kind shown in Fig. 2F which is identical to the carrier wave 29 of Fig. 2E except that it is shifted in phase by 90 degrees. Graphs 29 and 30 are shown on oscilloscopes 22 and 23 of Fig. 1 respectively.

On graphs 29 and 30 respective portions 31 and 32 represent portions of increased intensity on the oscilloscopes 22 and 23 and correspond to the time of occurrence of the burst gating pulse applied to burst gating means 12. The position of these bright portions 31 and 32 on the graphs 29 and 30 gives a rough indication as to the relative phase of the derived carrier wave from color synchronizing generator 13 with respect to the phase of the color subcarrier bursts on the color television signal as obtained from the bandpass amplifier.

From a comparison of the amplitudes of graphs 29 and 30 a comparison of the equality of the outputs from detectors 14 and 15 may be obtained. An indication of the linearity of these detectors may be obtained by varying the output of the signal generator 19 and noting the proportional change in the outputs of detectors 14 and 15 as evidenced by the change in amplitudes of graphs 29 and 30. An indication of the adjustment of the 90 degree phase shifter 16 may be obtained by applying the output from detector 14 to one set of deflection plates of a cathode ray oscilloscope and applying to the other set of plates of the oscilloscope the output of detector 15 and noting the departure of the resultant deflection from that of a circle. Once the master phase of the synchronizing generator 13, i.e., the phase of the output of this generator with respect to phase of reference subcarrier, is properly adjusted, and once the linearity of the detectors 14 and 15 as well as the equality of the outputs are set and once the 90 degree phase shifter is properly adjusted, the color picture can be readily brought in by adjustment of the master phase to obtain the proper color balance and by adjusting the chroma gain, that is, the gain of the bandpass amplifier 10 to obtain the proper intensity of picture.

Accordingly, it is seen that applicant has provided simple yet effective and efficient apparatus and procedure for the alignment of the complex and sensitive color synchronizing circuit of a color television receiver.

Referring now to Fig. 3, there is shown a schematic diagram of the circuit shown in block form in the dotted block of Fig. 1. This schematic represents a typical color synchronization and demodulation circuit of the kind used in a color television receiver and is shown for the purpose of illustrating the principles of the present invention.

The bandpass amplifier 10 comprises an electron discharge device 33 including a cathode 34, a grid 35, a screen grid 36, a suppressor grid 37, and an anode 38. The cathode 34 is connected to ground through cathode bias resistance 39 bypassed by bypass capacitor 40. The grid 35 is connected through grid leak resistance 41 to ground and also through coupling capacitor 42 to the variable tap 43 of potential divider 44 which is connected between input terminals 45 and 46 to which is applied the standard demodulated television signal and it is to these terminals that the output from the signal generator 19 is applied in the alignment procedure of the color circuits in accordance with the present invention. The screen grid 36 is connected through screen resistance 47 to the positive terminal of source 48, the negative terminal of which is connected to ground. The screen grid 36 is also connected through bypass capacitor 49 to ground. Suppressor grid 37 is connected to cathode 34. The anode 38 is connected through the primary 50 of coupling transformer 51 to the positive terminal of source 48. The primary 50 is shunted by capacitance 52. One end of the secondary 53 of transformer 51 is connected to ground, the other end is connected through coupling capacitor 54 to anode 38. The secondary 53 is shunted by capacitance 55. The transformer 51 is double tuned by capacitances 52 and 55 and the primary and secondary windings of this transformer are additionally coupled by capacitance 54 to produce a bandpass characteristic as shown in graph 11. Output from the bandpass amplifier 10 is obtained between terminal 56, connected to the junction of capacitances 54 and 55, and ground.

The output from the bandpass amplifier appearing between point 56 and ground is applied to the burst gate generator 12 and also to each of the synchronous detectors 14 and 15. The burst gate 12 comprises an electron discharge device 57 including a cathode 58, a grid 59, a screen grid 60, and an anode 61. The cathode 58 is connected to ground. The grid 59 is connected through grid leak resistance 62 through bias source 63 to ground. The grid 59 is also connected through coupling capacitor 64 to terminal 65 between ground and which is applied the burst gating signal synchronized with the horizontal deflection frequency of the receiver and which normally gates out the burst subcarrier signal of reference phase sent with the standard color television signal. The grid 59 is also connected through coupling capacitor 67 to the output of bandpass amplifier 10 at point 56. The screen grid 60 is connected through screen resistance 68 to the positive terminal of source 69, the negative terminal of which is connected to ground. The screen 60 is also connected through a screen bypass capacitance 70 to ground. The anode 61 is connected through the primary 71 of transformer 72 to the positive terminal of source 69. The primary 71 is shunted by variable capacitance 73 functioning to tune the primary 71. The secondary 74 of transformer 72 is shunted by a crystal device 75 and capacitor 76 connected in series across the ends thereof. The center tap of secondary 74 is connected to ground. Thus, when a continuous wave signal from the bandpass amplifier 10 having a frequency differing from the subcarrier frequency by an integral number of times the horizontal deflection frequency and also there is applied to the burst gating means 12 pulses having the horizontal deflection frequency, at the output between the anode 61 and ground is obtained a wave having a frequency spectrum including the frequency of the signal generator 19 and frequencies spaced integral multiples of the frequency of the horizontal deflection frequency therefrom as shown in the graph 26. The circuit including the crystal 75 is tuned to be responsive only to waves of the subcarrier frequency; consequently, the crystal 75 will be excited by the output from the gating means 12 and will produce damped waves of subcarrier frequency, the phase of which is in a fixed relationship to the phase of the continuous wave applied to the gating means 12. This phase may be controlled by the capacitance 73.

The output appearing between the junction of crystal 75 and capacitance 76, denoted point 77, is supplied through coupling capacitor 78 to the grid 79 of limiter 80 which includes a cathode 81, a suppressor grid 82, and an anode 83. Since the output from the color synchronizing generator comprising crystal 75 between point 77 and ground is a damped wave, it is necessary to limit the amplitude in order to obtain a wave of constant amplitude and a wave which can be used in the demodulation process at the detectors 14 and 15. A grid leak resistance 84 is connected between grid 79 and ground. The cathode 81 is connected to ground. The screen grid 82 is connected through screen resistance 85 to the positive terminal of source 86, the negative terminal of which is connected to ground. The screen 82 is also connected through screen bypass capacitance 87 to ground. The anode 83 is connected through the primary 88 of transformer 89 to the positive terminal of source 86. The primary 88 is shunted by tuning capacitance 90. The secondary 91 of transformer 89 is also shunted by a capacitance 92 and has one end connected to ground, and the output appearing between the other end and ground is applied to detector 14. Also, the output appearing between the one end of primary 88 at anode 83 and ground is applied to the detector 15.

It should be noted that during the occurrence of the horizontal frequency gating pulse applied to gating means 12, the phase of the wave applied to the detector 14 from the secondary 91 of transformer 89 is the same as the phase of the wave appearing between terminal 56 and ground, since the signal between terminal 56 and ground has undergone a 180 degree phase shift in the burst gating means 12, a 90 degree phase shift leading in the capacitance 78 and resistance 84 combination, an additional 180 degree phase shift in the limiter 80 and a further 90 degree phase shift lagging between the primary and secondary of tuned transformer 89. It is well known that in double tuned transformers, the phase of the voltage appearing across the secondary of the transformer lags by 90 degrees the phase appearing across the primary. Thus, from the foregoing it is also apparent that the phase of the voltage appearing across the primary of transformer 89 and applied to the synchronous detector 15 leads the phase of the voltage appearing between terminal 56 and ground by 90 degrees. The shifting of the phase of the voltage applied to one synchronous detector 14 with respect to that applied to other synchronous detector 15 is accomplished by the adjustment of the tuning capacitors 90 and 92.

Synchronous detector 14 comprises an electron discharge device 93 including a cathode 94, a first mixer grid 95, a screen grid 96, a second mixer grid 97, and an anode 98. The cathode 94 is connected to ground through cathode resistance 99. The mixer grid 95 is connected to ground through grid leak resistance 100 and is also connected through coupling capacitance 101 to the ungrounded end of the secondary of transformer 89. The screen grid 96 is connected through load resistance 102 to the positive terminal of source of operating potential 103. The grid 96 is also connected through bypass capacitor 104 to ground. The second mixer grid 97 is connected to point 56. This enables coupling of the signal from the bandpass amplifier 10 through point 56 to the second mixer grid 97 of the R–Y detector stage 14 and simultaneously to the second mixer grid 111 of B–Y detector 15. The anode 98 is connected through anode impedance 104*a* to the positive terminal of source 103. A low pass filter comprising inductance 105 and capacitance 106 connected in series between anode 96 and ground passes only modulating components of the demodulated subcarrier wave. Output is obtained between the junction of inductance 105 and capacitance 106, and ground.

The synchronous detector 15 is similar to the detector 14 and comprises electron discharge device 107, including a cathode 108, a first mixer grid 109, a screen grid 110, a second mixer 111, and an anode 112. The cathode 108 is connected through cathode resistance 13 to ground. The grid 109 is connected through coupling capacitance 114 to the anode 83 of device 80. The screen grid 110 is connected through load resistance 115 to the positive terminal of source 116 and also is connected through bypass capacitor 117 to ground. The second mixer grid 111 is connected to the point 56. The anode 112 is connected through anode load impedance 118 to the positive terminal of source 116. Low pass filter comprising inductance 119, capacitance 120, connected in series between anode 112 and ground is provided. Output from the low pass filter is obtained across capacitance 120.

Since the waves applied to the input grids 95 and 97 of synchronous detector 14 differ in frequency by an integral multiple of the horizontal scanning frequency, across the load impedance 104*a* is obtained a wave which has this difference frequency. Likewise, a wave having this difference frequency is obtained across the load impedance 118. However, since one of the waves applied to the detector 15 is 90 degrees out of phase with respect to the voltage applied to detector 14, the phase of the output across 118 will be 90 degrees out of phase with respect to the voltage appearing across the impedance 104*a*. The low pass filter across the outputs of these detectors insure that only the low frequency modulating components are obtained across the output of these detectors which in turn are applied to the matrix network 17 of Fig. 1.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim is new and desire to secure by Letters Patent of the United States is:

1. In a color television receiving system including a color synchronization and demodulation circuit to an input of which is applied the demodulated television signal and to another input of which is applied subcarrier burst gating pulses and from the output of which circuit is obtained a pair of waves each corresponding to a respective primary color component appearing on the subcarrier wave of the demodulated television signal, the method of ascertaining the characteristics of said color synchronizing circuit comprising applying to said one input a signal having a frequency differing from said subcarrier frequency by an integral multiple of the line scanning frequency of said system, applying to said other input subcarrier burst gating pulses, whereby at said output is obtained a pair of waves of a frequency which is said integral of said line scanning frequency, comparing the characteristics of said derived waves, thereby ascertaining the characteristics of said color synchronizing and demodulation circuit.

2. In a color television receiving system including a color synchronizing circuit having a pair of synchronous detectors each including a pair of input circuits and an output circuit, to one input of each of said detectors being applied the subcarrier wave of a demodulated television signal and to the other input of one of said detectors being applied a wave of subcarrier frequency and in phase therewith and to the other input of the other of said detectors being applied a wave of subcarrier frequency and in phase quadrature therewith, whereby at the output of each of said detectors is obtained a wave corresponding to a respective primary color component appearing on said demodulated subcarrier wave, said one wave of subcarrier frequency being obtained from a color synchronizing signal generator, said color synchronizing generator including a gating means periodically rendered operative at the horizontal scanning frequency of said system for allowing the synchronizing bursts of waves of subcarrier frequency appearing on the demodulated television signals to pass therethrough and synchronize the output of the color synchronizing generator with said bursts, the method of ascertaining the characteristics of said color synchronizing circuit comprising applying to each of said one inputs of said detectors a signal having a frequency differing from said subcarrier frequency by an integral multiple of the line scanning frequency of said system, applying to said burst gating means said same signal in addition to applying thereto a signal for rendering said burst gate means operative periodically at said horizontal scanning frequency, whereby at the output of said burst gating means is obtained a wave having said subcarrier frequency, said wave being passed to said color synchronizing generator to synchronize the latter therewith and applying the waves from said color synchronizing generator to said detectors one wave being applied in phase quadrature to the other, whereby at the outputs of said detectors is obtained a pair of waves of a frequency which is said integral of said line scanning frequency, comparing the characteristics of said waves from the output of said detectors, thereby ascertaining the characteristics of said color synchronizing circuit.

3. In combination, in a color television receiving system including a color synchronizing circuit having a pair of synchronous detectors each including a pair of input circuits and an output circuit, to one input of each of said detectors being applied the subcarrier wave of a demodulated television signal and to the other input of one of said detectors being applied a wave of subcarrier frequency and in phase therewith and to the other input of the other of said detectors being applied a wave of subcarrier frequency and in phase quadrature therewith, whereby at the output of each of said detectors is obtained an output corresponding to a respective primary color component appearing on said demodulated subcarrier wave, said one wave of subcarrier frequency being obtained from a color synchronizing signal generator, said color synchronizing generator including a gating means periodically rendered operative at the horizontal scanning frequency of said system for allowing the synchronizing bursts of waves of subcarrier frequency appearing on the demodulated television signals to pass therethrough and synchronize the output of the color synchronizing generator with said bursts, means for applying to each of said one inputs of said detectors a signal having a frequency differing from said subcarrier frequency by an integral multiple of the line scanning frequency of said system, means for applying to said burst gating means said same signal in addition to applying thereto a signal for rendering said burst gate means operative periodically at said horizontal scanning frequency, whereby at the output of said burst gating means is obtained a wave having said subcarrier frequency, said wave being passed to said color synchronizing generator to synchronize the latter therewith, whereby at the outputs of said detectors is obtained a pair of waves of a frequency which is said integral of said line scanning frequency, means for measuring the characteristics of said waves from the output of said detectors, thereby ascertaining the characteristics of said color synchronizing circuit.

4. In a color television receiving system including a color synchronizing circuit having a pair of synchronous detectors each including a pair of input circuits and an output circuit, to one input of each of said detectors being applied the subcarrier wave of a demodulated television signal and to the other input of one of said detectors being applied a wave of subcarrier frequency and in phase therewith and to the other input of the other of said detectors being applied a wave of subcarrier frequency and in phase quadrature therewith, whereby at the output of each of said detectors is obtained an output corresponding to a respective primary color component appearing on said demodulated subcarrier wave, said one wave of subcarrier frequency being obtained from a color synchronizing signal generator, said color synchronizing generator including a gating means periodically rendered operative at the horizontal scanning frequency of said system for allowing the synchronizing bursts of waves of subcarrier frequency appearing on the demodulated television signals to pass therethrough and synchronize the output of the color synchronizing generator with said bursts, the method of ascertaining the phase of said wave of subcarrier frequency applied to one of said detectors from said color synchronizing generator with respect to the phase of said subcarrier of reference phase comprising applying to each of said one inputs of said detectors a signal having a frequency differing from said subcarrier frequency by an integral multiple of the line scanning frequency of said system, applying to said burst gating means said same signal in addition to applying thereto a signal for rendering said burst gate means operative periodically at said horizontal scanning frequency, whereby at the output of said burst gating means is obtained a wave having said subcarrier frequency, said wave being passed to said color synchronizing generator to synchronize the latter therewith, whereby at the outputs of said detectors is obtained a pair of waves of a frequency which is said integral of said line scanning frequency, detecting the phase of one of said derived waves coincident with the time of operativeness of said gating means.

5. In a color television receiving system including a color synchronizing circuit having a pair of synchronous detectors each including a pair of input circuits and an output circuit, to one input of each of said detectors being applied the subcarrier wave of a demodulated television signal and to the other input of one of said detectors being applied a wave of subcarrier frequency and in phase therewith and to the other input of the other of said detectors being applied a wave of subcarrier frequency and in phase quadrature therewith, whereby at the output of each of said detectors is obtained an output corresponding to a respective primary color component appearing on said demodulated subcarrier wave, said one wave of subcarrier frequency being obtianed from a color synchronizing signal generator, said color synchronizing generator including a gating means periodically rendered operative at the horizontal scanning frequency of said system for allowing the synchronizing bursts of waves of subcarrier frequency appearing on the demodulated television signals to pass therethrough and synchronize the output of the color synchronizing generator with said bursts, the method of adjusting the phase of said wave of subcarrier frequency applied to one of said detectors with respect to the phase of the wave of subcarrier frequency applied to the other of said detectors comprising applying to each of said one inputs of said detectors a wave having a frequency differing from said subcarrier frequency by an integral multiple of the line scanning frequency of said system, applying to said burst gating means said same signal in addition to applying thereto a signal for rendering said burst gate means operative periodically at said horizontal scanning frequency, whereby at the output of said burst gating means is obtained a wave having said subcarrier frequency, said wave being passed to said color synchronizing generator to synchronize the latter therewith, whereby at the outputs of said detectors is obtained a pair of waves of a frequency which is said integral of said line scanning frequency, adjusting the phase obtained at the output of one of said detectors to be in quadrature with respect to the phase at the output of the other of said detectors.

6. In a color television receiving system including a color synchronizing circuit having a pair of synchronous detectors each including a pair of input circuits and an output circuit, to one input of each of said detectors being applied the subcarrier wave of a demodulated television signal and to the other input of one of said detectors being applied a wave of subcarrier frequency and in phase therewith and to the other input of the other of said detectors being applied a wave of subcarrier frequency and in phase quadrature therewith, whereby at the output of each of said detectors is obtained an output corresponding to a respective primary color component appearing on said demodulated subcarrier wave, said one wave of subcarrier frequency being obtained from a color synchronizing signal generator, said color synchronizing generator including a gating means periodically rendered operative at the horizontal scanning frequency of said system for allowing the synchronizing bursts of waves of subcarrier frequency appearing on the demodulated television signals to pass therethrough and synchronize the output of the color synchronizing generator with said bursts, the method of determining the relative output obtained from said detectors comprising applying to each of said one inputs of said detectors a wave having a frequency differing from said subcarrier frequency by an integral multiple of the line scanning frequency of said system, applying to said burst gating means said same signal in addition to applying thereto a signal for rendering said burst gate means operative periodically at said horizontal scanning frequency, whereby at the output of said burst gating means is obtained a wave having said subcarrier frequency, said wave being passed to said color synchronizing generator to synchronize the latter therewith, whereby at the outputs of said detectors is obtained a pair of waves of a frequency which is said integral of said line scanning frequency, comparing the amplitudes of said derived waves.

7. In a television receiver including a color synchronizing and demodulating circuit having a burst gate, a color synchronizing section and a pair of synchronous detectors each including a pair of inputs and an output, subcarrier wave signals of a demodulated television signal being applied to one input of each of said detectors, means to provide a signal having a frequency differing from said subcarrier frequency by an integral multiple of the line scanning frequency of said receiver, said last-named signal being applied to the other inputs of said detectors and to the burst gate, output of the detectors consisting of two sine waves of equal predetermined frequency of the order of magnitude easily observable on an oscilloscope, said burst gate producing a burst spectrum to which the color sync circuit can synchronize to the sideband that appears at the color subcarrier frequency.

8. The apparatus of claim 7 said detectors constituting an R–Y detector responsive to output of said band-pass amplifier and said color synchronizer and a B–Y detector responsive to output of said color synchronizer, and including a 90° phase shifter disposed between said color synchronizing circuit and said B–Y detector whereby equality of output of the two detectors, linearity and the 90° phase shift may be checked.

9. In the apparatus of claim 8 wherein said receiver includes a horizontal deflector system to provide horizontal sync pulses; means to approximately check the master phase from the position of the horizontal sync pulse on the predetermined frequency sine wave even in the absence of received color signals and wherein said receiver includes a chroma gain means and master phase control means so that after synchronization to the sideband that appears at the color subcarrier frequency is effected and equality of output of the detectors, linearity and the 90° phase shift are corrected the color picture may be brought in by use of only said chroma gain means and master phase control means.

References Cited in the file of this patent

UNITED STATES PATENTS 2,751,429 Schlesinger ------------ June 19, 1956

OTHER REFERENCES

Electronics, October 1952, pages 112, 113, 114.

WR61A Color Bar Generator, published by RCA, copyright 1954 (3 pp.). Copy in Division 16.

Rainbow Generator Radio-Electronics, January 1955, pages 79, 80, and 81. Copy in U.S. Patent Office Library.

RCA Preliminary Instruction Booklet for Type WR–61A Color Bar Generator, pages 1, 2 and 3. Copy in Div. 41.